(No Model.)
J. H. COOK.
ANIMAL TRAP.
No. 281,461. Patented July 17, 1883.
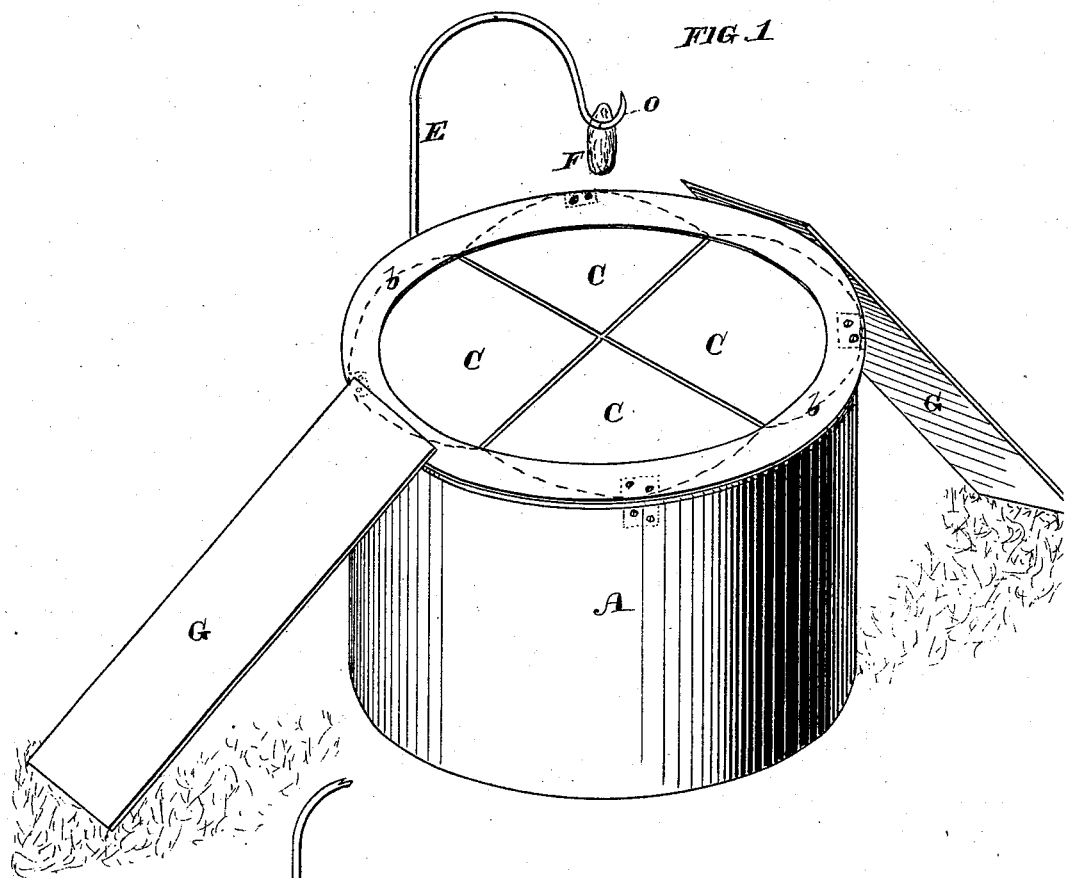
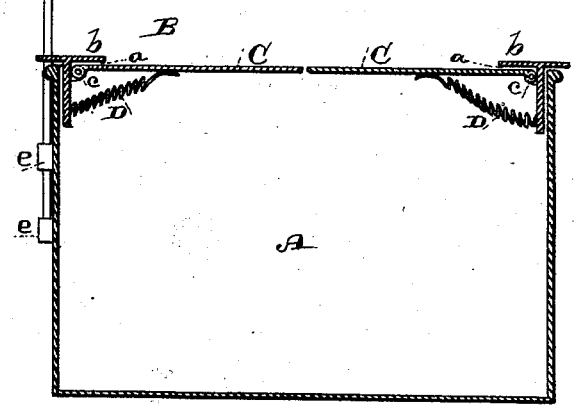
Witnesses,
Geo. H. Strong.
J. H. Rouse
Inventor
Jas. H. Cook
By Dewey & Co.
Attorneys

UNITED STATES PATENT OFFICE.

JAMES H. COOK, OF LONE PINE, CALIFORNIA.

ANIMAL-TRAP.

SPECIFICATION forming part of Letters Patent No. 281,461, dated July 17, 1883.

Application filed April 5, 1883. (No model.)

*To all whom it may concern:*

Be it known that I, JAMES H. COOK, of Lone Pine, county of Inyo, State of California, have invented an Improved Animal-Trap; and I hereby declare the following to be a full, clear, and exact description thereof.

My invention relates to a new and useful animal-trap of that class commonly known as the "gravitating platform," in which the weight of the animal causes his foundation to give way and to precipitate him into a receptacle.

My invention consists in the arrangement and construction of parts hereinafter claimed.

Referring to the accompanying drawings, Figure 1 is a perspective view. Fig. 2 is a vertical section.

A is a liquid-receptacle of suitable dimensions and construction, preferably cylindrical. B is its cover, having a flange adapted to fit down within its rim. This cover has a horizontal top flange, $b$, the outer portion of which covers the rim of the vessel A, and its inner portion projects sufficiently to form a shoulder or stop, $a$, for the hinged sectors C, as will be described. The entire top of the cover B is formed into a number of sectors, C, here shown as four in number, though I may have six or eight. These sectors are independent of each other, and are each hinged in their centers underneath to the flange of the cover, as shown at $c$.

The arc or rim of these sectors, struck on a curve of less diameter in order that the points or corners will not strike the sides in falling, lies just under the shoulder or stop $a$, formed by flange $b$, so that said sectors may move down, but cannot move up beyond a horizontal, being limited by the stop $a$.

Attached to the flange of the cover, on its inner side, are small springs D, the other ends of which bear up under the sectors C to return them to their places. Each sector has its own hinge, and each has its own spring, thereby rendering them wholly independent. The strength of these springs which sustain the sectors is barely sufficient to hold them in place. The least weight upon them will cause the springs to yield and allow the sectors to move down. These springs are here shown as spiral springs, though I may use any suitable form.

Upon the outside of vessel A are formed sockets $e$, into which an arm or wire, E, is fitted. This wire is extended up higher than the vessel, and is bent over to the center of the cover, and is adapted, by means of a small hook, $o$, on its end, to suspend a suitable bait, F, a few inches above the center of the trap.

G represents slats resting on the ground and upon the edge of the top of the trap.

The operation of this trap is as follows: The vessel A is to be filled half full with water. The animal—a rat, for example—attracted by the bait, approaches and goes up the inclined slats G to the top of the trap. The bait being slightly beyond his reach, he endeavors to get closer to it; but as soon as he puts the least weight upon any of the hinged sectors it gives way under him and he is precipitated into the water, in which he is drowned. The spring at once returns the sector to its place, and the trap is reset by presenting the same deceiving appearance as before. The rat, in his struggles, cannot get out, because the sectors will not rise above the horizontal or closed position because of the stop $a$.

I am well aware that the gravitating platform is not new.

Each sector is a trap of itself, and no matter from what direction or side the rat ventures, he is let down.

I am enabled to have small lids, which can therefore be nicely adjusted, and as each is independent of the other, wherever the weight is placed that one operates without interfering with or disturbing the remainder. I can make these covers with the independent hinged spring-sectors, as an article of manufacture, of various sizes to fit any kind of vessel, whether it be a common water-bucket or any other vessel.

Having thus described my invention, what I claim as new, and desire to secure by Letters Patent, is—

1. In an animal-trap, in combination with a receptacle or vessel, A, a cover or lid, B, formed with a number of independent hinged spring flaps or sectors, C, operating entirely below the level of the top of the trap, and hinged at their extreme outer edges, substantially as herein described.

2. In an animal-trap, in combination with a receptacle or vessel, A, the cover or lid B, having a horizontal flange, b, forming, with its projecting inner edge, a stop, a, the independent sectors or flaps C, hinged to the cover under the stop a, at their extreme outer edges, and the springs D, for resetting the sectors, substantially as herein described.

3. An animal-trap consisting of the vessel A, having sockets e, the cover B, having flange b, forming stop a, the independent sectors or flaps C, hinged to the cover under the stop a, the springs D, for resetting each sector, and the bait arm or wire E, secured in socket e, and having a hook, o, for suspending the bait over the center of the trap, substantially as herein described.

In witness whereof I hereunto set my hand.

JAMES H. COOK.

Witnesses:
 G. H. PALMER,
 D. H. WILLIAMS.